No. 715,738. Patented Dec. 16, 1902.
J. A. ANDERSON.
GUARD FOR BARB WIRE FENCES.
(Application filed Dec. 24, 1901.)

(No Model.)

WITNESSES:
D. O. Barnell.
H. J. Cowgill.

John A. Anderson.
INVENTOR

BY
his ATTORNEYS

UNITED STATES PATENT OFFICE.

JOHN A. ANDERSON, OF WAUNETA, NEBRASKA.

GUARD FOR BARB-WIRE FENCES.

SPECIFICATION forming part of Letters Patent No. 715,738, dated December 16, 1902.

Application filed December 24, 1901. Serial No. 87,081. (No model.)

*To all whom it may concern:*

Be it known that I, JOHN A. ANDERSON, a citizen of the United States, residing at Wauneta, in the county of Chase and State of Nebraska, have invented certain new and useful Improvements in Guards for Barb-Wire Fences; and I do hereby declare the following to be a full, clear, and exact description of the invention, such as will enable others skilled in the art to which it appertains to make and use the same.

My invention relates to improvements in guards for barb-wire fences; and it consists in a guard-wire and a series of brackets projecting out from the fence for holding said wire at a distance from the upper wire of said fence, so as to prevent live stock from injuring themselves on the barbs of the fence.

It also consists in certain other novel constructions, combinations, and arrangements of parts, as will be hereinafter fully described and claimed.

Figure 1:
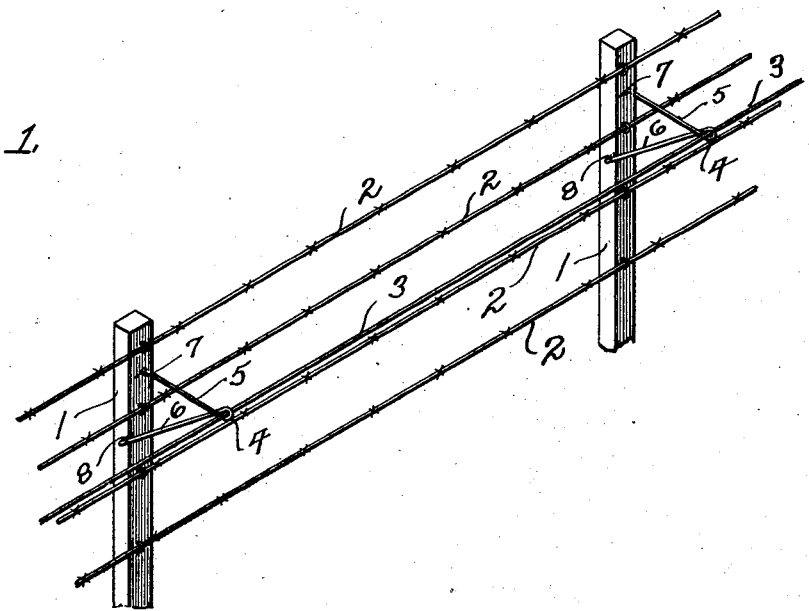
Figure 2:
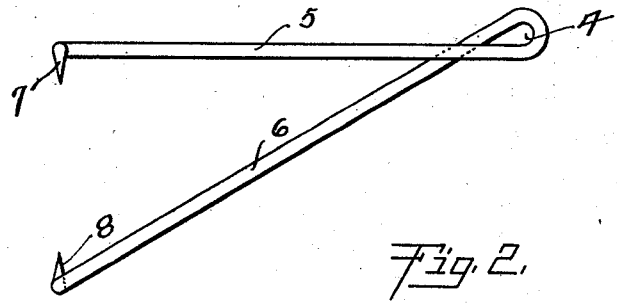
Figure 3:
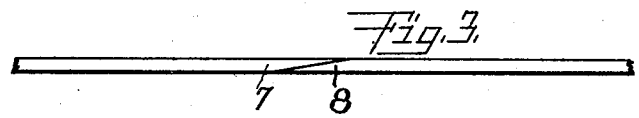

In the accompanying drawings, Figure 1 is a perspective view of a portion of an ordinary barb-wire fence having a guard-wire supported so as to project a considerable distance therefrom. Fig. 2 is a detail view of one of the brackets. Fig. 3 is a detail view showing the manner of cutting the rods of which the brackets are formed so as to have pointed ends and so as to enable the same to be produced at one operation and without waste.

The fence illustrated is of ordinary construction, being made up of posts 1 and having a series of barbed wires 2 strung upon the same. In using fences of this kind for fields or places where cattle or other animals are kept it is found that animals often hurt themselves quite seriously by coming in contact with the barbs of the fence. I therefore contemplate arranging a guarding means to keep the cattle away from the barbs, consisting, preferably, of a wire 3, supported at a suitable distance from the posts of the fence and the barbed wires thereof. The means for supporting this wire upon the fence constitutes an important feature of the invention. Said means consists in a series of brackets adapted to be secured to the posts 1 and project to one side thereof. Each of these brackets consists, preferably, of a rod or wire bent so as to form a loop near its center to inclose the guard-wire 3, the ends of the brackets being turned inwardly and made sharp, so that they may be driven into the sides of the fence-posts. While the brackets may be formed in various ways, I preferably form the same of iron or steel roding and bend the lengths of rod to form the guard-supporting loop 4. The iron or steel rod is preferably cut between the lengths, which are used for forming the bracket upon a diagonal line, as indicated in Fig. 3, forming sharp ends 7 and 8 upon each bracket-piece. In this way the sharp points of the brackets can be provided at the same time that the sections of the wire for the separate brackets are severed. There is also no waste material in forming the brackets in this way. After a section of a rod has been cut and looped at the center its ends are turned in approximately horizontal planes. The upper point 7 thus formed on the bracket is preferably driven into one side of the post while the lower point 8 is driven into the other side of the post. The points could of course be both turned the same way and the bracket be secured to the post by driving both points into the post on the same side thereof. It is preferable, however, to turn the points in opposite directions with respect to each other, so that the ends of the brackets may be secured on opposite sides of the posts, for in this way the bracket is well braced and capable of firmly holding the guard-wire in position. The brackets will also be thus easily attached to the post and without the necessity of using brace-wires or other additional means.

In mounting the guard-wire in position the guard-wire is easily slipped between the arms 5 and 6 of the brackets at the point where they cross each other for forming the loop 4, the roding composing the arms 5 and 6 of each brace being easily sprung apart for this purpose. After a bracket has thus been slipped upon the wire 3 its sharp points 7 and 8 are driven into the post, thus thoroughly locking the guard-wire within the loop 4. The arm 5 is preferably secured to the opposite side of the post from the side upon which it crosses the arm 6, and of course the arm 6 necessarily bears the same relation to the arm 5. This arrangement of the parts tend to more securely twist the loop portion 4 upon the wire 3.

From the above description it will be evident that my guard-wire mechanism is extremely simple in structure, inexpensive in production, and that the parts are readily and easily put into position.

I am aware of the fact that hitherto it has been proposed to provide a barbed-wire fence with a guard-wire erected contiguous thereto and supported by the fence-posts for the purpose of preventing cattle being injured by the barbs of the fence; but these structures were subject to certain disadvantages. As far as I am aware, they were erected by boring a hole in the fence and inserting therein a single stem or rod of wire carrying at the outer end a loop to support the guard-wire. Such a structure was easily injured or torn from the fence entirely by the cattle pulling the stem of the bracket from the hole. This I have obviated by bending the ends of the diverging arms of the bracket and driving such beveled ends into opposite ends of the post in different parallel planes, the loop portion still being maintained in the same vertical plane as the post, thus permitting the guard-wire to be carried thereby parallel to the barb-wire strands.

Having fully described my invention, what I claim as new, and desire to secure by Letters Patent of the United States, is—

1. A guard for barbed-wire fences comprising the fence-posts, a guard-wire, and means for rigidly supporting said guard-wire at a distance from the posts, said supporting means consisting of a bracket constructed of a single piece of wire bent inwardly to form a tang to enter one side of the fence-post, extended thence forming an arm in a horizontal plane and in the vertical plane of the side of the post, thence bent back and under the horizontal arm forming a closed loop to receive the guard-wire, extended inwardly and downwardly to the opposite side of the fence-post forming a brace-arm inclined to both the horizontal and vertical planes of the first arm, and bent inwardly forming a tang to enter the last-mentioned side of the post.

2. In a guard for barbed-wire fences, the combination with a post, of a wire-bracket provided with an arm secured at its inner end to one side of the post and extending horizontally in the vertical plane of said side, a brace-arm extending inward from the outer end of the first arm at an inclination to both the vertical and horizontal planes of the first-mentioned arm and secured to the opposite side of the post, the two arms being bent and crossed for forming a loop at the outer end of the bracket, substantially as described.

3. In a guard for barb-wire fences, the combination with a fence-post, of a bracket for supporting a guard-wire formed of a single piece of wire having two arms with tangs at their free ends parallel with each other and adapted to enter the opposite sides of said post, the arms being crossed at their outer ends forming a closed loop to receive the guard-wire, one arm extending, when secured to the post, in a horizontal plane and in the vertical plane of its side of the post, and the second or brace arm being inclined to both said horizontal and vertical planes, substantially as described.

In testimony whereof I hereunto affix my signature in presence of two witnesses.

JOHN A. ANDERSON.

Witnesses:
H. PERSON,
C. A. KING.